March 6, 1928.

F. H. McCORMICK 1,662,031

ELECTRICALLY HEATED DEVICE

Filed Sept. 11, 1925

Inventor:
Francis H. McCormick,
by
His Attorney.

Patented Mar. 6, 1928.

1,662,031

UNITED STATES PATENT OFFICE.

FRANCIS H. McCORMICK, OF GLEN ELLYN, ILLINOIS, ASSIGNOR TO EDISON ELECTRIC APPLIANCE COMPANY, INC., OF CHICAGO, ILLINOIS, A CORPORATION OF NEW YORK.

ELECTRICALLY-HEATED DEVICE.

Application filed September 11, 1925. Serial No. 55,822.

Figure 1:
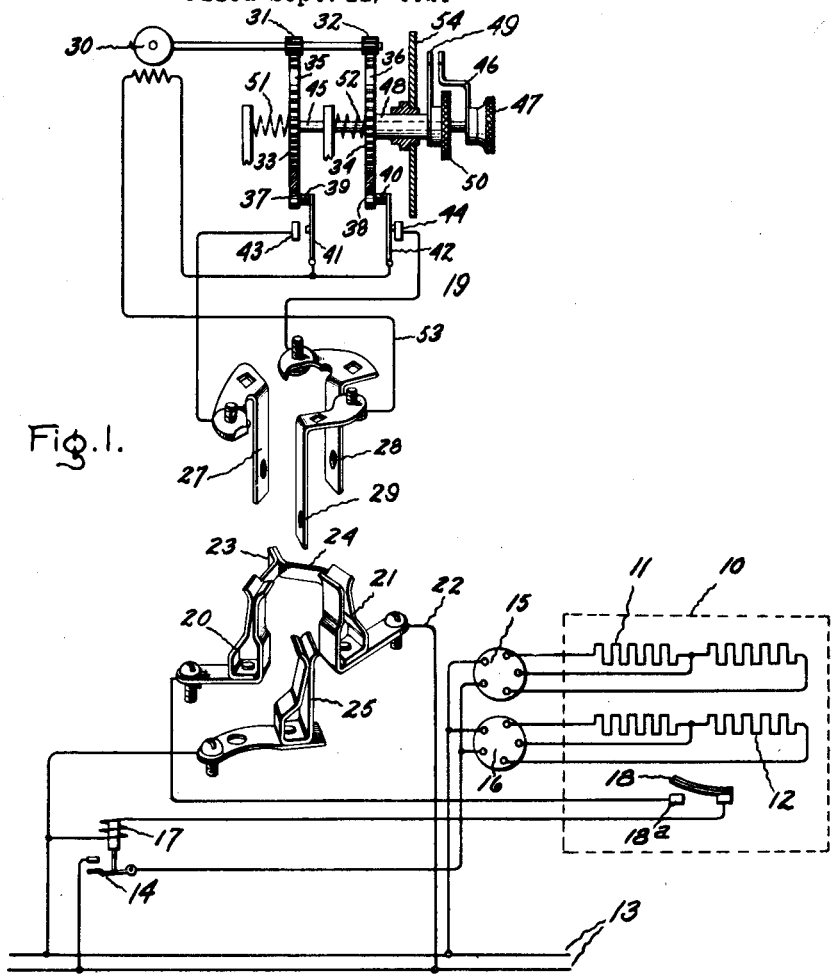
Figure 2:
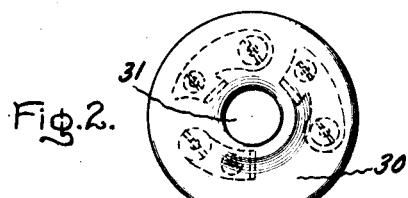
Figure 3:
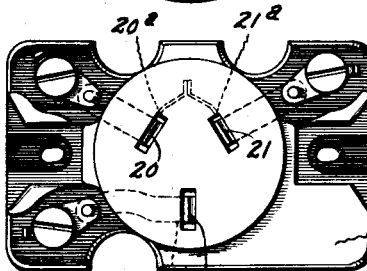

My invention relates to electrically heated devices, and has for its object the provision of improved controlling means for such devices.
More specifically, my invention relates to electrically heated devices, such as ovens and the like, in which suitable mechanism is sometimes provided for automatically applying and cutting off the heat at predetermined times such, for example, as described and claimed in Patent 1,495,045, to Rankin, dated May 20, 1924.
In one of its aspects my invention relates to an arrangement or an attachment whereby the oven or other heated device may be manufactured with standard equipment without the automatic control mechanism, special connecting means being provided whereby the automatic control mechanism, which is also manufactured as a separate device, may be connected if desired. This obviously avoids the necessity of having two standardized sets of devices, one equipped with automatic control and the other without. Furthermore, the automatic equipment may be added subsequently at any time.
For a more complete understanding of my invention, reference should be had to the accompanying drawing in which Fig. 1 is a diagrammatic representation of an electric oven provided with control means embodying my invention, while Figs. 2 and 3 are detailed views showing the electrical connecting means.
Referring to the drawing, I have shown my invention in one form as applied to an electrically heated oven 10, indicated by dotted lines, which is provided with heating resistors 11 and 12. The resistors 11 and 12 are energized from a suitable electrical supply source 13, a contactor switch 14 being included in the circuit with the resistors. Suitable three-heat switches 15 and 16 are also connected in circuit with the resistors 11 and 12 respectively whereby the connections may be varied to change the rate of heat generation in a well known manner. As shown, each resistor is divided into two sections, the connection of which is controlled by the switches 15 and 16 in such manner that both sections of each resistor may be connected in parallel to the supply source for high heat, and in series for low heat, one section only being connected for intermediate heat.

The contactor 14 is operated by a coil 17 which is connected to the supply source 13 in circuit with a temperature responsive device shown as a thermostat 18. This thermostat is exposed to the heat of the oven and operates to open the circuit of the coil 17 upon the occurrence of a predetermined maximum temperature and close its circuit upon the occurrence of a predetermined minimum temperature, whereby a predetermined mean temperature is maintained in the oven.
In order to provide for the connection of suitable time control means 19 in circuit with the thermostat 18, stationary resilient contact clips 20 and 21 are provided, the clip 20 being connected directly to the fixed contact 18ª with which the thermostat cooperates, while the clip 21 is connected through a conductor 22 to the side of the supply source 13 opposite to that to which the thermostat is connected. The clips 20 and 21 carry resilient contacts 23 and 24 respectively, which are arranged to engage each other normally and thus close a circuit from the contact 18ª to the supply source. A third stationary clip 25 is also provided. This clip is connected to the same side of the supply source 13 as the thermostat. As shown in Fig. 3, the contact clips 20, 21 and 25 may conveniently be secured on a base member 26 made of porcelain or other electrically insulated material, the clips being secured in suitable apertures 20ª, 21ª and 25ª in the base member whereby contact pins may be inserted into engagement with them.
The time control mechanism 19 has its terminals connected to three contact pins 27, 28 and 29 which are arranged to engage with the contact clips 20, 21 and 25 respectively. These contact pins may conveniently be secured to a supporting member 30 (Fig. 2) made of suitable electric insulating material and having a central aperture 31 through which conductors may extend for connection with the pins. To assure the insertion of the pins into contact with the respective clips as previously indicated, the clips 20 and 21 are arranged nearer to each other than to the third clip 25, the pins 27 and 28 being similarly arranged with respect to the pin 29. Furthermore, the arrangement is such that the insertion of the pins 27 and 28 into the clips 20 and 21 springs the clips outward slightly, enough to separate the two contacts 23 and 24 whereby the time control mechanism is inserted in circuit with the thermostat 18. When the time control mechanism is removed the contacts 23 and 24 reengage to maintain the thermostat circuit. As shown, each contact clip is provided with two resilient jaws between which the pins 27 and 28 are forced, the outer jaws of the clips 20 and 21 carrying the contacts 23 and 24.

While any suitable time control mechanism may be used I have shown for the purpose of illustration the mechanism disclosed in the aforesaid patent to Rankin. This mechanism consists, briefly, of a constant speed electric motor 30 of the eddy current type which drives two pinions 31 and 32, these pinions being shown as mounted on the shaft of the motor. The pinions cooperate with two gear wheels 33 and 34 which are provided with mutilated sections or blank spaces 35 and 36 on their peripheries whereby when a pinion 31 or 32 arrives at a blank space no further rotation of the particular gear wheel takes place. The gear wheels are also provided respectively with apertures 37 and 38 near their peripheries, which apertures are adapted to receive pins 39 and 40 mounted upon resilient switch members 41 and 42. These switch members cooperate with stationary contacts 43 and 44, the switch member 41 being in engagement with the contact 43 when the pin 39 falls in the aperture 37, and the switch member 42 being normally in engagement with the contact 44 and breaking contact when the pin enters the aperture 38.

The gear wheel 33 is secured to a shaft 45 which is provided with a pointer 46 and may be turned by means of a knurled knob 47. The gear wheel 34 is similarly secured to a sleeve 48 which is concentric with the rod 45 and carries a pointer 49 together with a knurled knob 50. The shaft 45 and the sleeve 48 are mounted so that they may be moved axially toward the left by pressing upon the knobs 47 and 50 and are normally forced toward the right so that the gear wheels mesh with the respective pinions by means of springs 51 and 52. As shown, the switch arms 41 and 42 are electrically connected in series with the motor 30 and by way of conductor 53 to the contact pin 29. The contacts 43 and 44 are connected respectively to the pins 27 and 28.

After the time control mechanism has been connected by inserting the contact pins in the clips, the electrical connections and the operation of the device is substantially as described in the aforesaid patent to Rankin. Assuming that the operator wishes to have the resistors automatically connected to the supply source at 4 o'clock so that the oven will be heated and that it is desired that the current be turned off at 6 o'clock, the operator will press inward on the knob 47 to free the gear wheel 33 from the pinion 31 and then turn the knob until the pointer 46 indicates 4 o'clock on a suitable stationary dial 54. The gear wheel 33 is then moved back by the spring 51 into engagement with the pinion 31. Since the apparatus has been left in a position so that the pin 39 is in the aperture 37, by turning the gear wheel 33 the pin 39 is caused to ride on the face or side of the gear wheel whereby the switch member 41 is moved to disengage the contact 43. In like manner, the pointer 49 is turned to indicate 6 o'clock, the time when the circuit is to be opened, and the switch member 42 is thereby caused to engage the contact 44 whereby the motor circuit is closed. This starts the electric motor. The motor continues to operate and at 4 o'clock the gear wheel 33 will be turned to such a position that the pin 39 will enter the aperture 37 whereby the circuit is closed through the coil 17 of the contactor switch and the heating resistors thereby connected to the supply circuit, the thermostat being then in engagement with the contact 18$^a$, since the oven is cold. As the oven heats up the thermostat will operate as previously described to maintain a predetermined desired temperature. When the hour of 6 o'clock arrives, the aperture 38 will have been moved in front of the pin 40, which will thereupon enter the aperture 38, whereby the switch member 42 is caused to disengage the stationary contact 44 and open the control circuit. This stops the electric motor 30 and deenergizes the contactor coil 17 whereby the heating resistors are disconnected.

By means of this arrangement the oven is constructed with the thermostatic control only and the time mechanism constructed separately as an attachment which may be added subsequently as desired by simply plugging in the contact pins.

It will be observed that the current to run the motor 30 is carried through the contact clip 25. In case a spring operated timer mechanism is used, this clip is unnecessary.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. The combination with an electrically heated device, of a thermostat arranged to control an electric circuit to regulate the temperature of said device, automatic time control means, connecting means including means normally maintaining said circuit closed, and cooperating means operated to open said circuit by the connection of said time control means whereby said automatic time control means may be connected in said circuit.

2. The combination with an electrically heated device, of a thermostat arranged to control an electric circuit to regulate the temperature of said device, automatic time control means, and connecting means whereby said automatic time control means may be connected in said circuit, said connecting means comprising contacts normally in engagement to maintain said circuit closed but separated by the connection of said automatic time control means.

3. The combination with an electrically heated device, of a thermostat arranged to control an electric circuit to regulate the temperature of said device, automatic time control means, quick detachable means whereby said time control means may be connected in said circuit, and means cooperating with said quick detachable means for closing said circuit when said time control means is disconnected.

4. The combination with an electrically heated device, of a thermostat arranged to open and close an electric circuit to regulate the temperature of said device, automatic time control means, and a quick detachable connection whereby said time control means may be connected in said circuit, said quick detachable connection comprising contacts normally in engagement to maintain said circuit closed, and means for separating said contacts and for including said time control means in said circuit.

5. An attachment for electrically heated devices provided with a control circuit, comprising automatic time control means, quick detachable means for connecting said automatic time control means in said control circuit, and means biased to closed position for closing said control circuit when said time control means is disconnected.

6. An attachment for electrically heated devices provided with a thermostatically controlled circuit, comprising automatic time control means, means for connecting said automatic time control means in said circuit, and means for automatically closing said control circuit when said time control means is disconnected.

7. The combination with an electrically heated range of a thermostat arranged to control an electric circuit to regulate the temperature of said device, a contact receptacle on said range provided with contacts normally in engagement to maintain said control circuit closed, automatic time control means, and a plug arranged to cooperate with said receptacle to separate said contacts and connect said time control means in said circuit.

8. The combination with an electrically heated range of a thermostat arranged to control an electric circuit to regulate the temperature of said range, a pair of flexible contact clips connected in said circuit, contacts carried by said clips normally in engagement to establish said circuit, automatic time control means, and spaced plug contacts connected to said time control means cooperating with said clips to separate said contacts and thereby connect said time control means in said circuit.

In witness whereof, I have hereunto set my hand.

FRANCIS H. McCORMICK.